United States Patent [19]

Greenberg et al.

[11] 4,222,268
[45] Sep. 16, 1980

[54] DISPOSABLE THERMOMETER

[76] Inventors: Mishel Greenberg, 105 Patton Blvd., New Hyde Park, N.Y. 11040; Michael Kearney, 89 Pomona Ave., Milford, Conn. 06460; Milton P. Chernack, 399 June Pl., West Hempstead, N.Y. 11552

[21] Appl. No.: 60,610

[22] Filed: Jul. 25, 1979

[51] Int. Cl.³ ............................................. G01K 5/08
[52] U.S. Cl. ...................................... 73/371; 73/72; 73/373
[58] Field of Search ................. 73/371, 372, 373, 374, 73/375, 376, 377, 378, 368, 368.2

[56] References Cited
U.S. PATENT DOCUMENTS

| | | | |
|---|---|---|---|
| 2,677,965 | 5/1954 | Saffir | 73/374 |
| 3,469,451 | 9/1969 | Eizenberg | 73/371 |
| 3,717,035 | 2/1973 | Klingler | 73/371 |
| 3,809,229 | 5/1974 | Wahlig | 73/371 |
| 3,915,004 | 10/1975 | Nollen et al. | 73/371 |
| 3,950,994 | 4/1976 | Gart | 73/371 |

Primary Examiner—Donald O. Woodiel

Attorney, Agent, or Firm—Morgan, Finnegan, Pine, Foley & Lee

[57] ABSTRACT

A thermometer comprising: a molded plastic body member having a recess in one side forming a reservoir for a temperature indicating fluid and a relatively wide capillary passageway in fluid communication with the reservoir. Adjacent the capillary passageway is temperature indicating indicia. There is a relatively thin metal lid which seals the reservoir and conducts heat rapidly to the temperature indicating fluid when the thermometer is in use. The invention includes means for retaining the temperature indicating fluid in position so that the temperature can be read and recorded after the thermometer has been removed from a patient. There are several embodiments of the temperature indicating retaining means and these embodiments utilize air at atmospheric pressure to prevent the regression of the temperature indicating fluid into the reservoir after the thermometer has been removed from a patient.

In another form of the invention means is provided so that after the level of the temperature indicating fluid has been read and recorded, the temperature indicating fluid can be forced to return to the reservoir.

11 Claims, 21 Drawing Figures

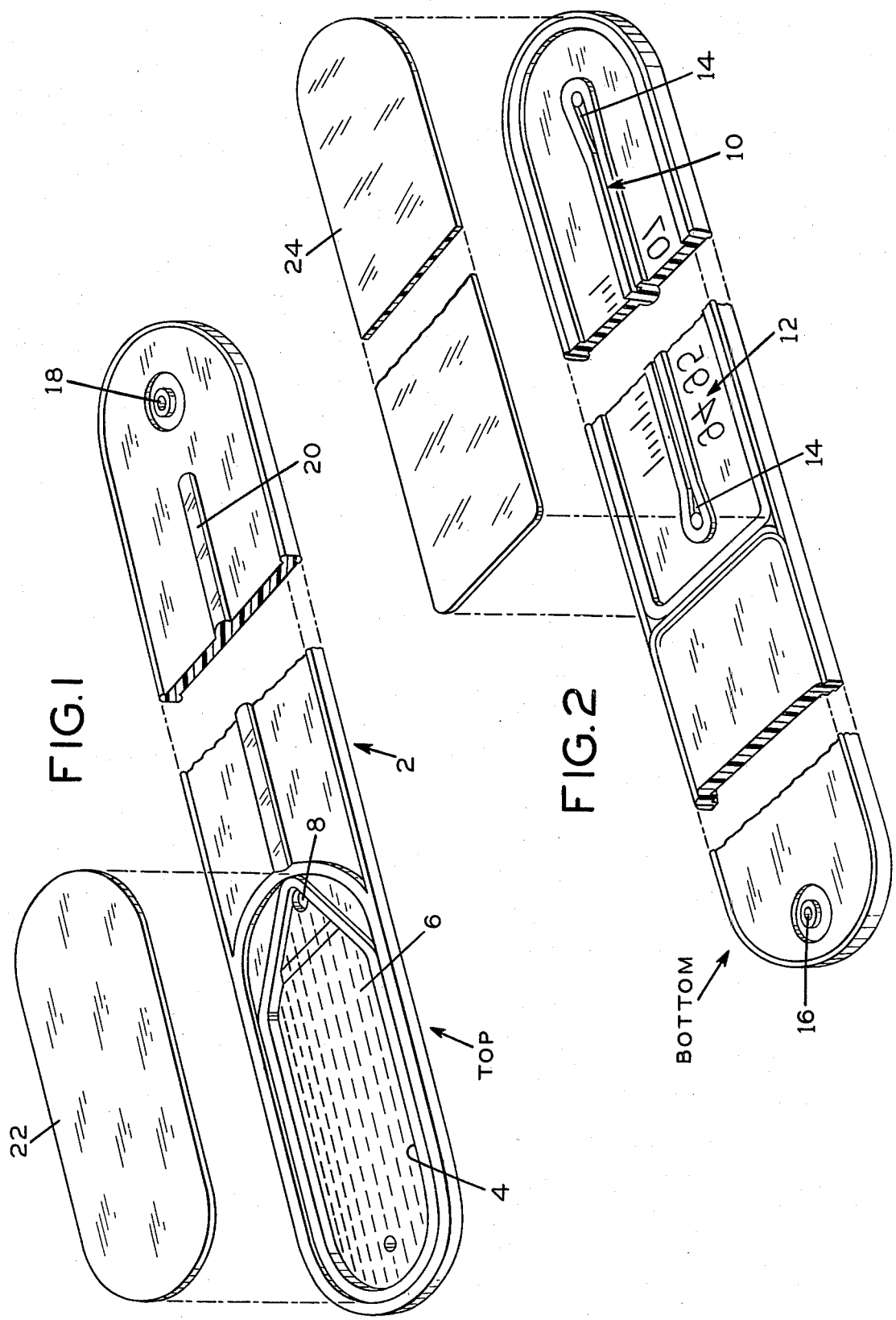

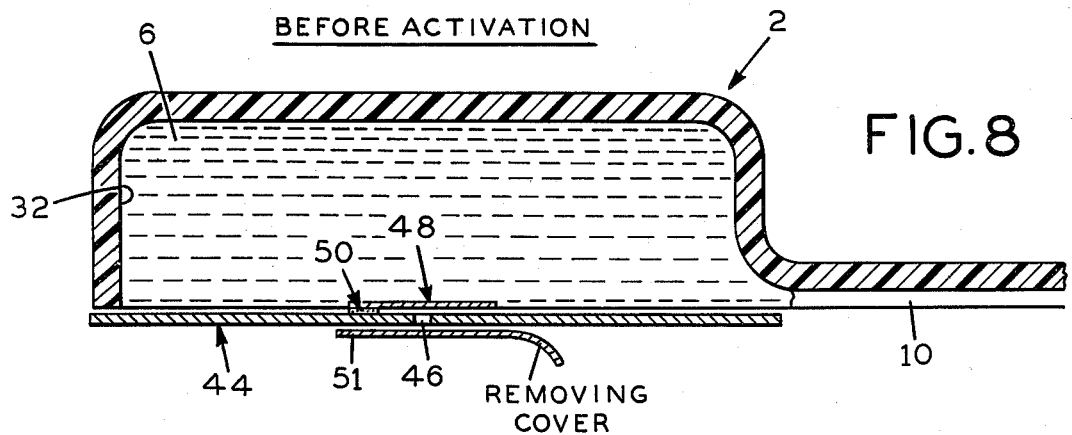
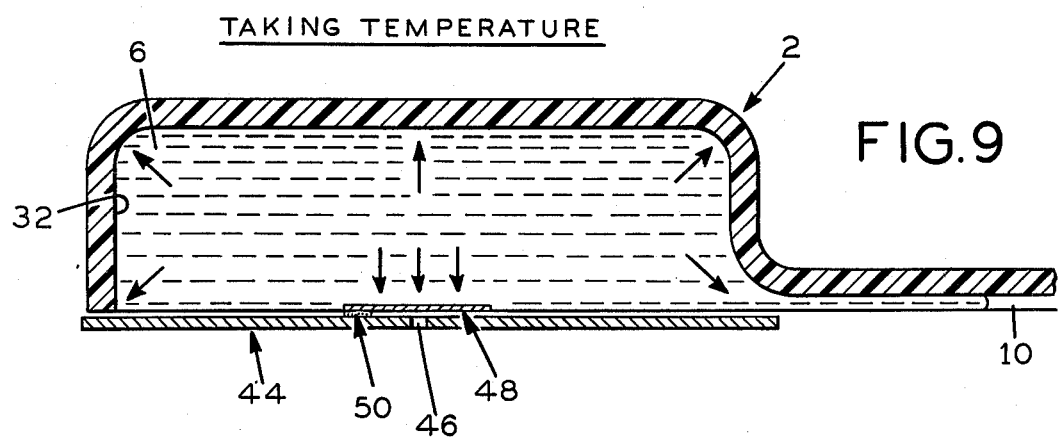
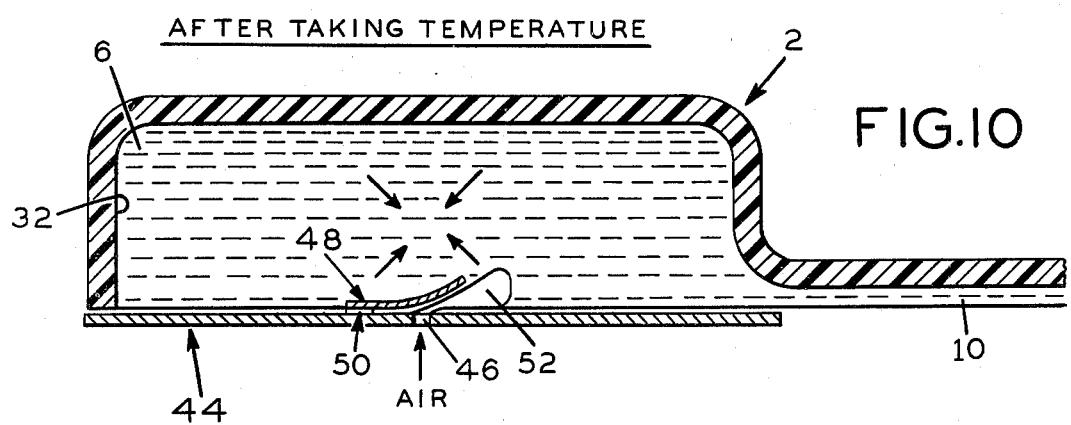

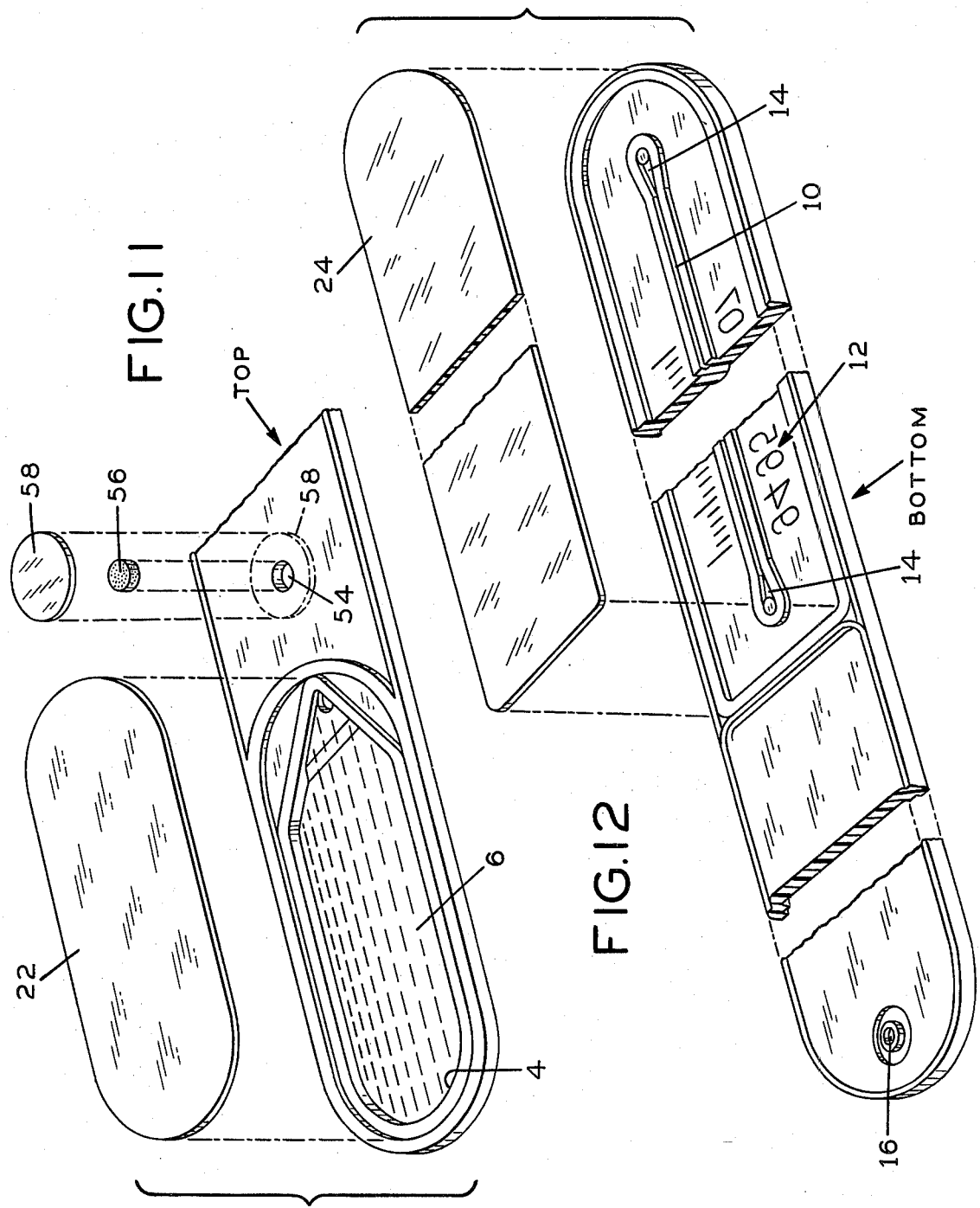

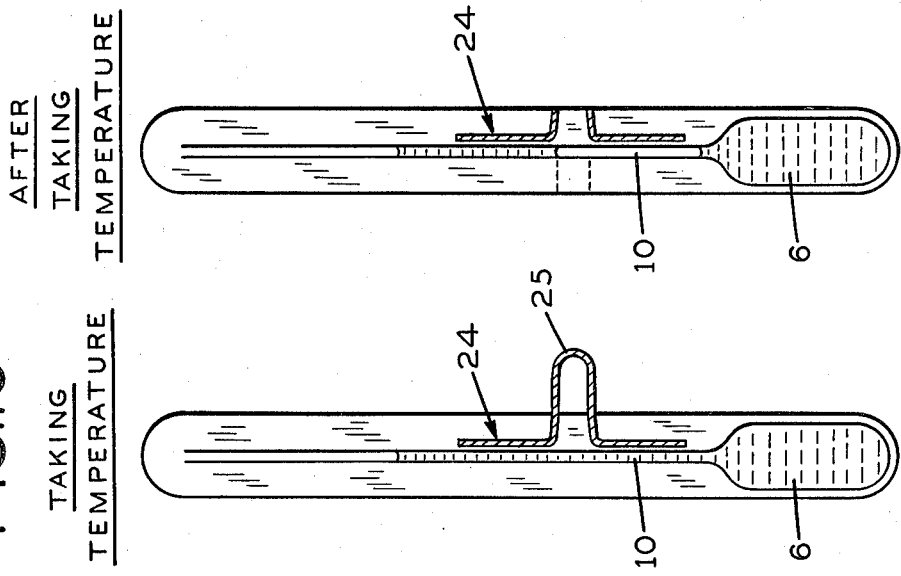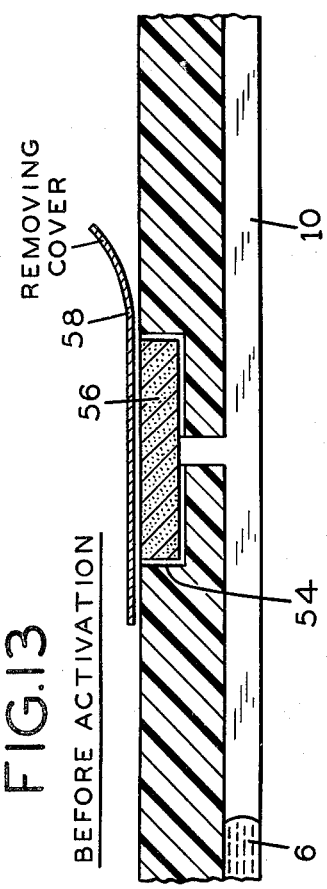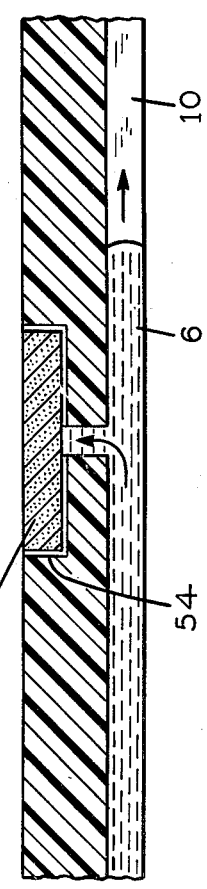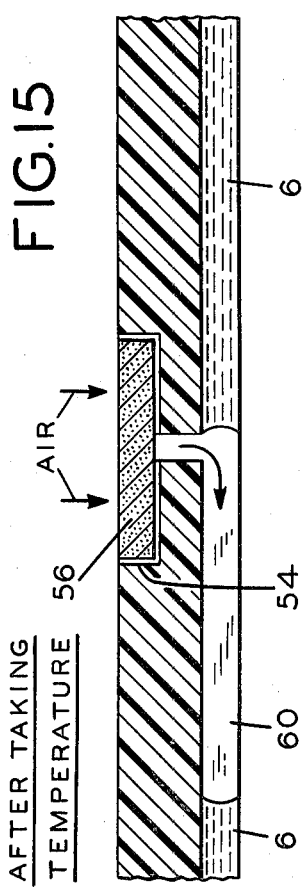

DISPOSABLE THERMOMETER

BACKGROUND OF THE INVENTION

This invention relates to thermometers for humans and more particularly to a thermometer which is safe, accurate, relatively easy to manufacture and capable of being manufactured in mass production numbers.

In recent years the use of glass mercury thermometers has been questioned because such thermometers are expensive to manufacture, present a potential breakage problem and usually are not economically disposable.

Glass thermometers also present a problem of sterilization which of course, is highly desirable if they are to be reused particularly by other patients. If the thermometers are not properly sterilized after use there is a danger of transmission of infectious diseases by cross-contamination.

Typically, in glass thermometers mercury has been used as the temperature indicating substance in the thermometer because of certain of mercury's physical characteristics which enable it to indicate the patient's temperature even long after removal from the patient. The use of mercury, however, creates potential health hazards in the event of thermometer breakage while in use.

The use of mercury as the temperature indicating fluid creates toxicity problems during the manufacturing process. The calibration of glass thermometers traditionally has been a time consuming process not easily adaptable to automation and masss production.

Nevertheless, despite certain shortcomings of glass thermometers they remain the most popular of the devices for determining the temperature of human beings. Also the use of mercury continues to be the most widely used temperature indicating fluid.

Attempts from time to time have been made to produce disposable thermometers using materials such as plastic and using liquids other than mercury as the temperature indicating liquid but such attempts have been largely not satisfying because of inaccuracy, expense, manufacturing complexities and inability to obtain temperature retention qualities after removal from the patient. In other words where liquids other than mercury have been used as the temperature indicating liquid it has been necessary to read the thermometer while it is in the patient or an inaccurate reading will be obtained.

An additional problem has been to prevent premature recording of temperature due to elevated storage temperature prior to use by patient. Warehouse temperatures, for example, can be significantly higher than human temperatures.

OBJECTS

In view of the foregoing, it is an object of this invention to provide a disposable thermometer for human use.

Another object of this invention is to provide a thermometer made of such material as to be a highly accurate temperature measuring device and yet is economical to manufacture.

A still further object of this invention is to provide a thermometer having temperature reading retention means which permits the use of temperature indicating liquids other than mercury and which permits accurate temperature measurement after the thermometer has been removed from the patient.

Another object of this invention is to provide a thermometer made of such materials that it can be stored in warehouses even at elevated temperatures.

A further object of this invention is to provide a disposable thermometer utilizing a temperature indicating liquid other than mercury having a temperature reading indicating retention means.

Another object of this invention is to provide a temperature reading indicating retention means wherein upon contraction of the fluid caused by cooling, air will fill the space created by the contraction.

Additional objects and advantages of the invention will be set forth in the description which follows and, in part, will be obvious from the description, the objects and advantages being realized and obtained by means of the instrumentation, parts, methods, apparatus and procedures particularly pointed out in the appended claims.

BRIEF DESCRIPTION OF THE INVENTION

Briefly described, the invention comprises a thermometer body member made of suitable plastic material capable of being injected molded into the desired configuration. The body member includes a relatively large reservoir or recess which is in fluid communication with a relatively wide passageway having temperature marking indicia adjacent thereto. Closing one side of the reservoir is a metal lid which seals the reservoir and conducts heat rapidly to the temperature indicating fluid therein. The invention also includes means for maintaining the temperature indicating fluid in place even after removal from the patient.

The invention consists of the novel parts, steps, constructions, improvements shown and described.

The accompanying drawings which are incorporated in and constitute part of this specification illustrate an embodiment of the invention and together with the description serve to explain the principles of the invention.

OF THE DRAWINGS

FIG. 1 is an exploded view taken from the top.

FIG. 2 is an exploded view taken from the bottom.

FIG. 8 is a cross-sectional view of the means shown in FIG. 7 showing the means before activation.

FIG. 9 is a cross-sectional view of the means shown in FIG. 7 ready to take the patient's temperature.

FIG. 10 is a cross-sectional view of the means shown in FIG. 7 after the patient's temperature has been taken.

FIG. 11 is an exploded view from the top of another embodiment of a temperature reading retention means.

FIG. 12 is an exploded view from the bottom of the temperature reading retention means shown in FIG. 11.

FIG. 13 is a cross-sectional view of the means shown in FIG. 11 showing the means before activation.

FIG. 14 is a cross-sectional view of the means shown in FIG. 11 while temperature is being taken.

FIG. 15 is a cross-sectional view of the means shown in FIG. 11 after the patient's temperature has been taken.

FIG. 16 is a cross-sectional view of another form of temperature reading retention means showing the means in condition to take the patient's temperature.

FIG. 17 is a cross-sectional view of the means shown in FIG. 16 after the patient's temperature has been taken.

DETAILED DESCRIPTION OF THE INVENTION

Figure 7:
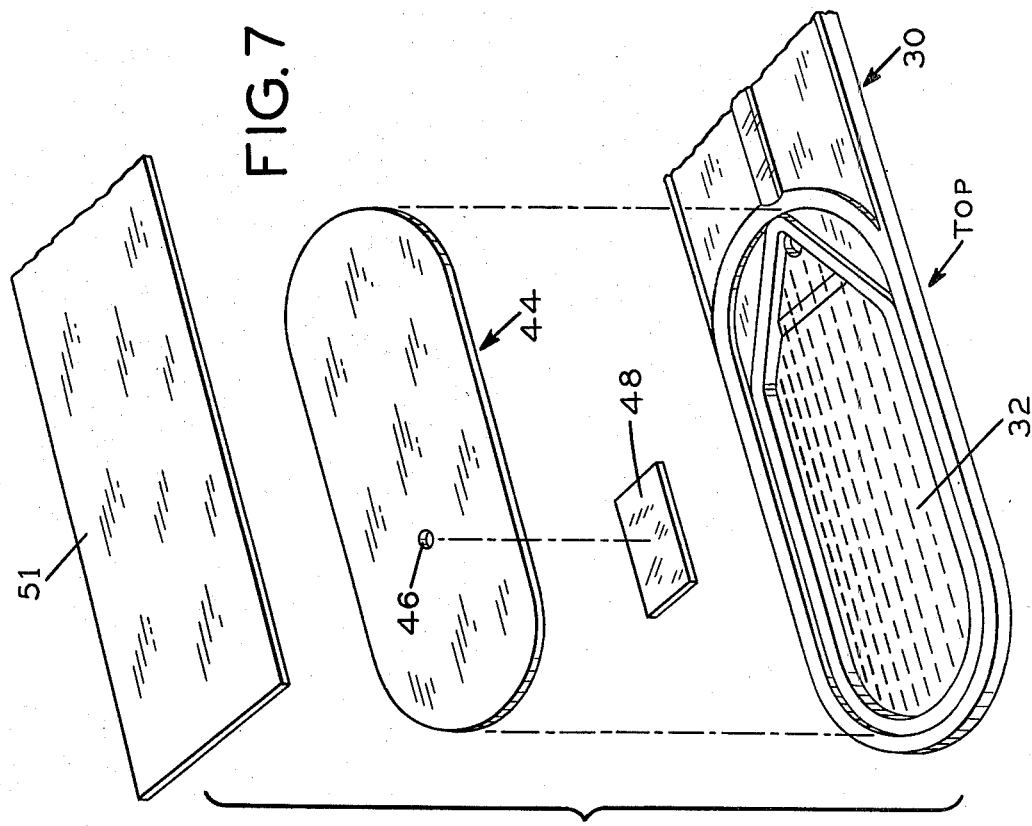
FIG. 7 is an exploded view of another embodiment of a temperature reading retention means.
Figure 3:
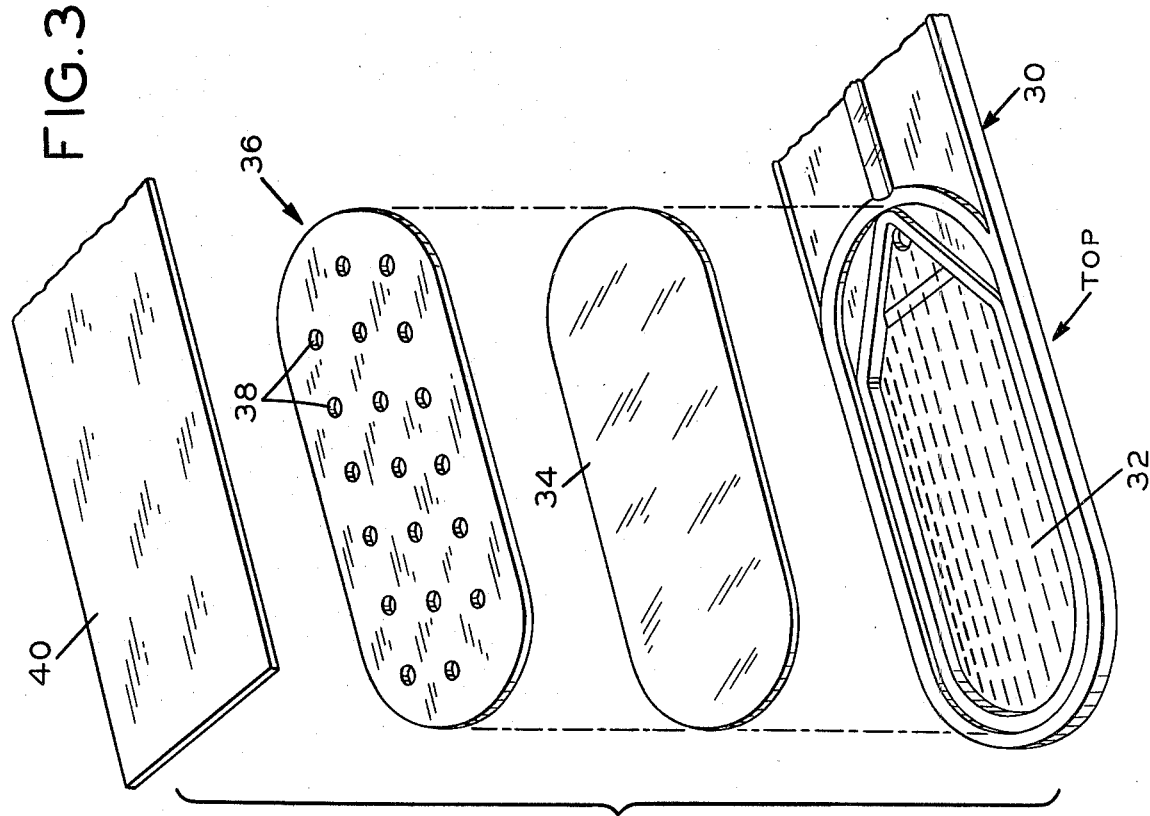
FIG. 3 is an exploded view of a temperature reading retention means.

Referring to FIG. 1 there is shown a main thermometer body 2 which can be made of injection molded styrene acrylonitrile or general purpose polystyrene. The plastic material can also be polycarbonate, acrylic, polysulfone or other plastic. The body member 2 is preferably molded so as to provide a relatively large reservoir or recess 4 adapted to receive a temperature indicating fluid 6 to be described subsequently. The temperature indicating fluid 6 expands with increased temperature through opening 8 and into channel 10 of capillary size illustrated in FIG. 2. Adjacent the channel or capillary 10 are a plurality of marked degree indicia 12 which indicates the temperature of the patient using the thermometer. Preferably these degree indicia 12 will be formed during the molding of the body member 2. In order to prevent damage to the disposable thermometer due to increased temperatures encountered during transport or warehousing the passageway 10 is expanded or widened. Passageway 10 is widened as shown at 14 to allow expansion above normal human temperature. A wider channel can contain substantial expanded volume of liquid in a short length for those temperatures which are not calibrated.

In order to fill the body member 2 with the temperature indicating liquid the body member is provided with entrance orifice 16 and exit orifice 18. The temperature indicating fluid enters through entrance orifice 16 and is forced into the thermometer body until overflow occurs through exit orifice 18. The filling operation is done at the maximum temperature to be encountered during storage. The volume of reservoir 4 and associated passageways determines the total volume of fluid at filling temperature. This volume subsequently contracts or expands with temperature change determining the level to which channel 10 is filled with liquid. The length of channel 10 is marked with degree indicia 12 corresponding to the level of liquid volume at various temperatures.

In order to make reading of the temperature easier the body member 2 is provided with a magnifier portion 20 which visually enlarges the width of passageway 10.

The temperature indicating liquid reservoir 4 is closed on its open side by a metal lid or cover 22 which completely closes the recess 4 except for the passageway 8. The metal lid is attached to the body 2 to cover the recess 4 by any convenient adhesive such as cyanoacrylate or a pre-applied pressure sensitive or heat activated adhesive. As shown in FIG. 2, the thermometer body has attached thereto a film lamination 24 which seals the passageway 10 along its entire length thus forming a closed passageway.

The film 24 may be made of a polyester with or without a foil lamination. The foil seals the thermometer from moisture and gas and acts as a visual reflector to assist in reading the thermometer.

The temperature indicating fluid has a greater volume expansion rate with temperature than mercury which permits the width of passageway 10 to be greater than possible with mercury. This provides a larger dimension relative to manufacturing tolerance, resulting in great accuracy. It also makes temperature reading easier. Preferably the temperature indicating fluid may be glycerine, fluorocarbon liquid or silicone. These fluids have been found to be non-toxic, relatively low in cost and suitable for manufacturing purposes.

In accordance with this invention means is provided for maintaining the temperature indicating fluid at the highest temperature registered despite cooling after removal from the patient.

In the conventional glass-mercury thermometer, as is well known, after the thermometer is removed from the patient the patient's temperature is determined by observation of the location of the mercury column with respect to the temperature degree markings.

The mercury column remains adjacent the highest temperature reached despite lower temperatures encountered after removal from the patient. In the conventional glass-mercury thermometer the mercury passes from the reservoir bulb through a constriction and then into a calibrated space having temperature indicia thereon. After removal from the patient the mercury cools and attempts to return to the reservoir bulb but, instead, breaks into two parts one above and one below the constriction. A characteristic of mercury is that it has an attraction for itself which is greater than the force required to overcome the resistance of the constriction in order to join the two separated columns. For these reasons the upper mercury column remains in the position adjacent the highest temperature to which the thermometer was subjected. In order to join the separated columns it is necessary to "shake-down" the thermometer in the well known manner.

In accordance with this invention a temperature indicating fluid other than mercury is used. In this invention a temperature indicating fluid such as glycerine, fluorocarbon or silicone would be used. None of these materials has the unusual characteristics of mercury which has been described above.

Accordingly, with the thermometer described in FIG. 1 and FIG. 2 it would be necessary to read the patient's temperature while the thermometer is in the patient. Thus an accurate temperature reading would not be obtained after the thermometer was removed from the patient because the temperature indicating fluid will retreat into the reservoir.

Therefore, in accordance with this invention means is provided for retaining the temperature indicating fluid at the highest temperature reached.

In other words this means prevents the temperature indicating fluid from retreating into the reservoir after removal from the patient due to reduction of the volume of the temperature indicating fluid caused by cooling of the fluid after removal from the patient.

A first temperature reading retention means embodiment is illustrated in FIGS. 3-6.

As shown therein the main thermometer body 30 has the relatively large temperature indicating liquid reservoir 32. Positioned in sealing engagement with the thermometer body 30 is a relatively thin film 34. Positioned in face-to-face relationship with the thin film 34 is a thin metal plate 36 having a plurality of apertures or openings 38 therein.

Prior to use the thermometer is protected and insulated by a protective cover 40.

Figure 4:
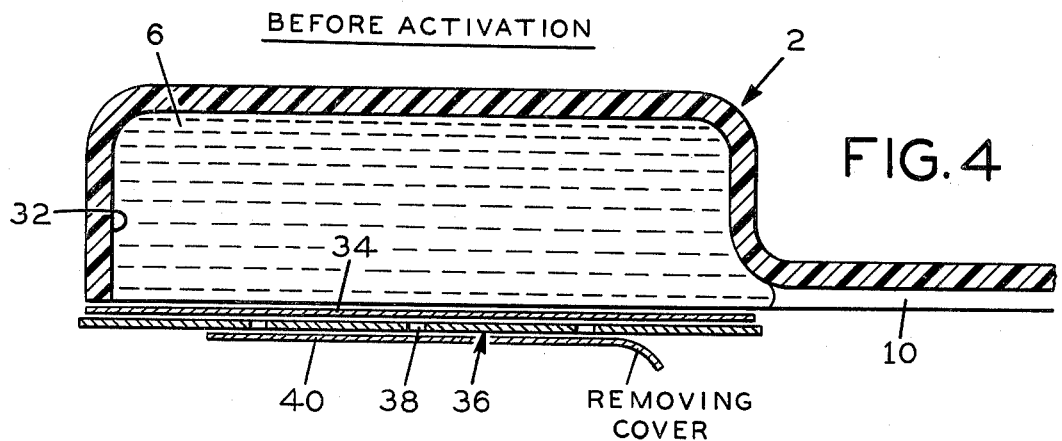
FIG. 4 is a cross-sectional view of the means shown in FIG. 3 showing the means before activation.
Figure 5:
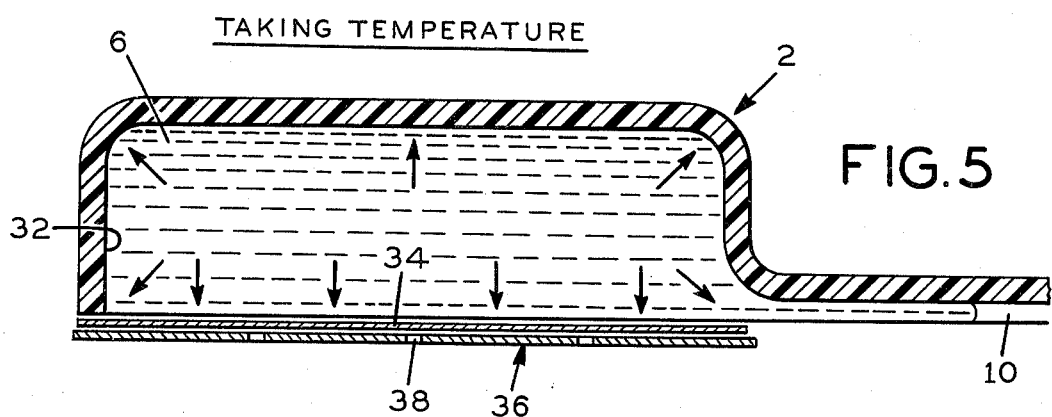
FIG. 5 is a cross-sectional view of the means shown in FIG. 3 ready to take the patient's temperature.
Figure 6:
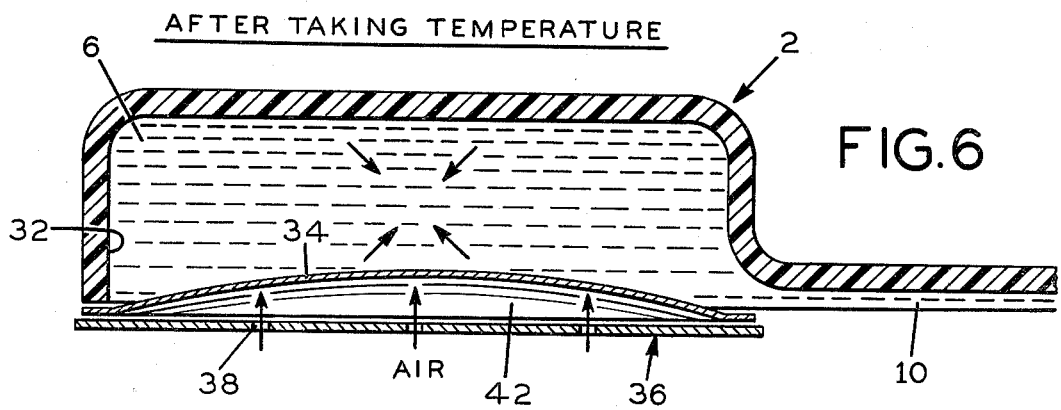
FIG. 6 is a cross-sectional view of the means shown in FIG. 3 after the patient's temperature has been taken.

The method of operation of this embodiment of the invention is illustrated in FIG. 4, FIG. 5 and FIG. 6.

The first step, shown in FIG. 4, in the operation is to remove by peeling, for example, the protective cover 40 from the outer surface of the metal cover 36. The protective cover 40 insulates the metal cover 36, holes 38 from air pressure. Removal is accomplished by peeling the protective cover as illustrated in FIG. 4.

With the protective coating or cover removed the thermometer in the condition shown in FIG. 5 is inserted into the patient for a suitable period of time and then removed.

After the thermometer has been removed (FIG. 6) the temperature indicating fluid cools and starts to contract which creates a void 42 within the reservoir 32. As this occurs air under atmospheric pressure rushes through apertures 38 forcing the film or diaphragm 41 inwardly to fill the void 42 being created by the contraction of the temperature indicating fluid.

The air moves more rapidly than the temperature indicating fluid so that the temperature indicating fluid in the passageway 10 remains in a stationary position so that the highest temperature reached can be observed and recorded.

Another temperature reading retaining means embodiment is illustrated in FIGS. 7-10, inclusive. In this embodiment the temperature indicating fluid is in the recess or reservoir 32 which is closed by the metal cover 44. The metal cover has an aperture 46 which is normally closed by the flap valve 48 fixed at one end to the metal cover 44 and free at the other end. As can be seen in FIG. 10 one side of the flap valve is connected to the cover 44 by a suitable means such as an adhesive 50. As in the case of the previous embodiment there is an activator shield 51 which must be peeled away from the outer surface of cover 44 so as to uncover opening 46 as shown in FIG. 8. In FIG. 9 the thermometer is shown in its in-use position. In this position the temperature indicating liquid expands according to the temperature to which it is subjected.

After the thermometer has been removed from the patient the temperature indicating fluid cools and begins to contract creating a void 52. Air, however, under atmospheric pressure enters through the opening 46 by pushing the flap 48 to the out of the way position shown in FIG. 10. The air fills the void or cavity 52 faster than the temperature indicating fluid can move into the void. As a result the temperature indicating fluid remains stationary so the patient's temperature can be observed and recorded.

Another embodiment of the temperature reading retention means is illustrated in FIGS. 11-15, inclusive.

In this embodiment there is a hole or opening 54 in communication with the passageway or capillary 10. Positioned within the hole is a porous membrane 56 having a porasity which permits air to flow through it but which does not permit fluid to flow through. The porous membrane is protected by a film 58 attached to the body member and extending over the porous membrane 56.

In order to activate this device the protective film 58 is peeled away as shown in FIG. 13. The thermometer is then used to take the patient's temperature as illustrated in FIG. 14 with the temperature indicating liquid moving in the direction shown to the position determined by the temperature. This expansion of the temperature indicating fluid moves the temperature indicating fluid beyond the opening 54 which is filled by the porous membrane 56.

After a suitable interval the thermometer is removed from the patient and the temperature indicating liquid cools and contracts to form a void 60. At this point air flows through the porous membrane and into the void 60 before the temperature indicating fluid can fill the void. For this reason the temperature indicating fluid remains stationary and can be observed and recorded.

Reference will now be made to FIGS. 16 and 17. These figures show another technique for temperature reading retention which retains the embodiment of FIG. 1, changing only the lid 24. The lid is extended at the side to create a tab 25, after the temperature is taken. The tab is pulled tearing the lid across channel or capillary 10. This permits air to enter channel 10 as liquid is contracting upon cooling. This is the same principle as the other three methods of retaining column position by the introduction of air to fill the void. However, this method is not automatic but requires that someone tear the strip immediately, before the liquid has cooled.

Another embodiment of this invention is shown in FIGS. 18-21. This form of the invention relates to a plastic thermometer which is reusable, preferably by the same patient only.

Figure 18:
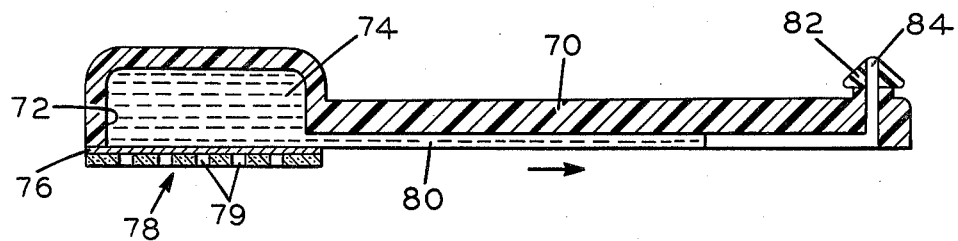
FIG. 18 is a cross-sectional view of another embodiment of the invention showing the device in use.

In this embodiment, referring to FIG. 18, there is a body 70 having a reservoir 72 having an expanding fluid 74 therein. When the patient's temperature is taken the expanding temperature indicating fluid forces the diaphragm 76 against a rigid porous plate 78 which covers the open side of the reservoir 72. The plate 78 has a plurality of holes or apertures 79 therein. The temperature indicating fluid expands into the capillary 80 until the expanding column reaches a height determined by the patient's temperature.

Figure 19:
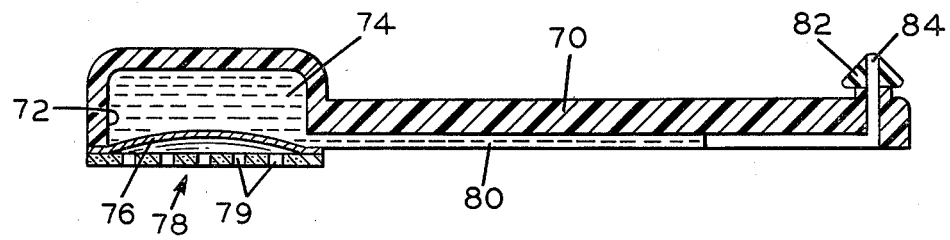
FIG. 19 is a cross-sectional view of the device shown in FIG. 18 after the patient's temperature has been taken.

FIG. 19 shows the state of the thermometer as it is removed from the patient. At this point the temperature indicating fluid begins to cool and starts to contract in reservoir 72. The temperature indicating column, however, does not move because air under atmospheric pressure rushes through the apertures or holes in plate 78 moving the film 76 inwardly and filling the space created by the contracting temperature indicating liquid. In this way the temperature indicating liquid is maintained in position and the temperature indicating liquid column remains at its maximum level.

Figure 20:
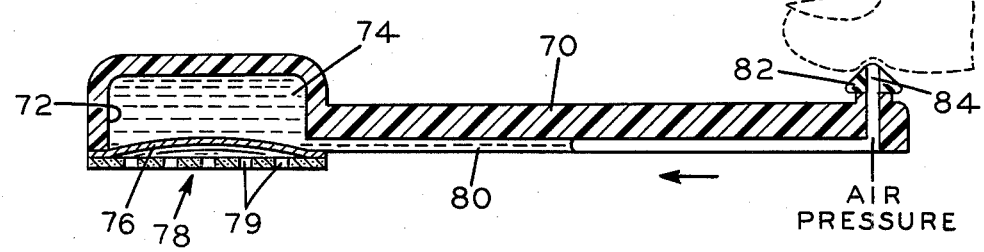
FIG. 20 is a cross-sectional view of the device shown in FIG. 18 being reactivated.
Figure 21:
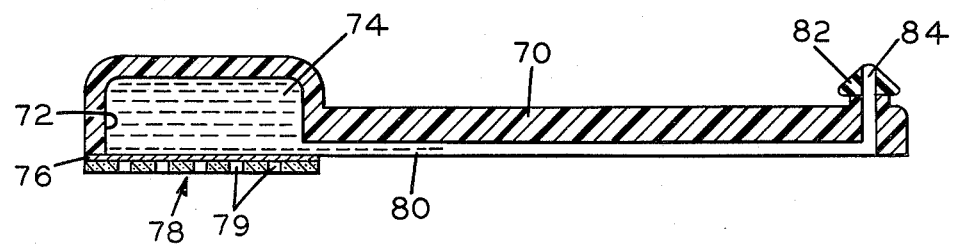
FIG. 21 is a cross-sectional view of the device shown in FIG. 18 after reactivation.

In accordance with this form of the invention means is provided for returning the temperature indicating liquid to its original level. This means is illustrated in FIGS. 20 and 21. As embodied, the end of the capillary 80 terminates in a flexible dome 82 made of a low duramenter rubber or its equivalent. The flexible dome 82 has an opening 84 therein.

The temperature indicating liquid is returned to its original position as follows. A finger is placed on the flexible dome 82 so as to cover and close the opening 84. The pressure is applied by the finger to the flexible dome to enter the capillary 80 and push the temperature column indicating liquid column toward the reservoir 72. The temperature indicating liquid thus creates pressure against the film 76 as indicated by the arrows.

This restores the original volume of liquid to the reservoir 72 and the liquid in the capillary 80 returns to its original level as shown in FIG. 21. The thermometer is now ready to be used again to register temperature.

What is claimed is:

1. A thermometer comprising:
   (a) a plastic thermometer body having a relatively large recess on one side of said body forming a reservoir for a temperature indicating liquid;
   (b) a capillary passageway in fluid communication with said reservoir;
   (c) a lid covering and closing the open side of said capillary passageway;
   (d) a temperature indicating liquid within said reservoir adapted to expand into said capillary passageway; and
   (e) heat conducting metal cover means closing said reservoir so as to permit communication between said reservoir and said capillary passageway.

2. A thermometer as defined in claim 1 having:
   (a) temperature indicia means on said body adjacent said capillary passageway.

3. A thermometer as defined in claim 2 having:
   (a) means on said body for magnifying said capillary passageway.

4. A thermometer as defined in claim 1 having:
   (a) means for retaining said temperature indicating liquid at its highest level after removal from the patient.

5. A thermometer as defined in claim 4 wherein said temperature reading retention means utilizes air at atmospheric pressure to maintain said temperature indicating fluid at its highest level even after removal from the patient.

6. A thermometer as defined in claim 5 wherein said temperature reading retention means includes:
   (a) a relatively thin metallic heat conducting plate adjacent said reservoir;
   (b) at least one opening in said metallic plate;
   (c) shield means on said metallic heat conducting plate covering at least said opening, said shield means being adapted to be removed prior to use of said thermometer;
   (d) means cooperating with said metallic heat conducting plate for causing air at atmospheric pressure to prevent the contraction of said temperature indicating fluid after the thermometer has been removed from the patient.

7. A thermometer as defined in claim 6 wherein said temperature reading retention means comprises:
   (a) a thin film diaphragm closing the open side of said reservoir and in sealing engagement with said body;
   (b) a relatively thin metallic heat conducting plate having a plurality of apertures therein in face-to-face engagement with said diaphragm; and
   (c) a protective film in engagement with the outer surface of said metallic plate;
   (d) said protective film being adapted to be removed immediately prior to using said thermometer.

8. A thermometer as defined in claim 6 wherein said temperature reading retention means comprises:
   (a) a relatively thin metallic cover in engagement with said body and closing the open side of said reservoir;
   (b) a relatively small opening in said metallic cover;
   (c) a flap valve on the inside of said metallic cover, one end of said flap valve being attached to said metallic cover adjacent said opening, the other end of said flap valve being unattached;
   (d) a protective film in engagement with the outer surface of said metallic plate;
   (e) said protective film being adapted to be removed immediately prior to using said thermometer.

9. A thermometer as defined in claim 5 wherein said temperature reading retention means comprises:
   (a) an aperture in said body in communication with said capillary passageway;
   (b) a porous membrane positioned within said aperture, said membrane having a porosity such that air can pass therethrough but liquid does not pass therethrough;
   (c) a protective film in engagement with the outer surface of said porous membrane;
   (d) said protective film being adapted to be removed immediately prior to using said thermometer.

10. A thermometer as defined in claim 5 wherein said temperature reading retention means comprises:
    (a) a tab extending from said lid;
    (b) said tab upon manual manipulation after the patient's temperature has been taken being adapted to remove a portion of said lid covering said capillary passageway so that said capillary passageway is exposed to air which prevents the temperature indicating fluid from changing its position.

11. A thermometer comprising:
    (a) a plastic thermometer body having a relatively large recess on one side of said body forming a reservoir for a temperature indicating liquid;
    (b) a capillary passageway in communication with said reservoir;
    (c) a temperature indicating liquid within said reservoir adapted to expand into said capillary passageway;
    (d) a relatively thin, flexible diaphragm closing the open side of said reservoir;
    (e) a metallic plate having a plurality of apertures therein attached to said body and positioned when the thermometer is not in use in face-to-face engagement with said diaphragm;
    (f) a flexible dome at the end of the capillary passageway opposite from said reservoir there being a small opening through said dome in communication with said capillary passageway;
    (g) said flexible dome being depressed by finger pressure after the patient's temperature has been taken and recorded to thereby return the temperature indicating liquid to its original position so that said thermometer can be reused.

* * * * *